(12) United States Patent
Asano et al.

(10) Patent No.: US 6,649,680 B2
(45) Date of Patent: Nov. 18, 2003

(54) FLAME RETARDANT RESIN COMPOSITION

(75) Inventors: Takayuki Asano, Hyogo (JP); Kiyoshi Shimizu, Osaka (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/951,670

(22) Filed: Sep. 13, 2001

(65) Prior Publication Data

US 2002/0055563 A1 May 9, 2002

(30) Foreign Application Priority Data

Sep. 18, 2000 (JP) ........................................ 2000-281420

(51) Int. Cl.⁷ .............................. C08K 5/24; C08K 5/54
(52) U.S. Cl. ........................ 524/261; 524/100; 524/267; 524/418; 524/423; 524/404; 524/424; 524/430; 524/506
(58) Field of Search ................................. 524/430, 506, 524/100, 261, 267, 418, 404, 423, 424

(56) References Cited

U.S. PATENT DOCUMENTS 6,090,907 A * 7/2000 Saito et al. ................. 528/198
6,214,908 B1 * 4/2001 Le et al. ...................... 524/59

FOREIGN PATENT DOCUMENTS

| JP | 06128434 | 5/1994 |
| JP | 06263948 | 9/1994 |
| JP | 08176425 | 7/1996 |
| JP | 08176427 | 7/1996 |
| JP | 11140294 | 5/1999 |

* cited by examiner

Primary Examiner—Kriellion A. Sanders
(74) Attorney, Agent, or Firm—Flynn, Thiel, Boutell & Tanis, P.C.

(57) ABSTRACT

The present invention provides a flame retardant resin composition having a good fluidity and excellent recycling property, can yield a molded article having excellent rigidity and flame retardancy, and is particularly applicable for a molded article having a small thickness. Specifically, the flame retardant resin composition contains:

100 parts by weight of a thermoplastic resin (A);

0.5 to 100 parts by weight of a liquid crystal polymer (B); and 0.1 to 30 parts by weight of a silicone compound (C) as a flame retardant.

15 Claims, No Drawings

FLAME RETARDANT RESIN COMPOSITION

FIELD OF THE INVENTION

The present invention relates to a flame retardant resin composition having a good fluidity and excellent recycling property, and can yield a molded article having an excellent rigidity and flame retardancy.

PRIOR ART

To impart thermoplastic resins with a flame retardancy as high as V-0 or V-1 according to the UL94 standards, molded articles are composed of resin compositions in which red phosphorus, an organophosphorus compound such as triphenyl phosphate or the like is blended and used as a flame retardant. However, it is pointed out that, when these molded articles are discarded in a landfill, there may occur contamination of water by enrichment of seas, rivers, lakes or ponds due to elution of the phosphorus therefrom.

As an example of using flame retardants that contain no phosphorus, technologies that realize flame retardancy by compounding thermoplastic resins with silicone compounds are disclosed in JP-A 6-128434, JP-A 6-263948, JP-A 8-176425, JP-A 8-176427, and JP-A 11-140294. However, in these technologies, since the flame retardant compositions used have excellent flame retardancy and a poor fluidity, when they are applied to housing or chassis applications for computer monitors and the like, the molded articles obtained have poor moldability, particularly in thin portions. As a result, when meeting the requirements of size and weight reduction of recent years, a problem arises that the molded articles have insufficient rigidity. To improve fluidity and increase moldability, a method of compounding a plasticizer may be used. However, there arises another problem of a decreasing heat resistance of the molded articles, indicated by deflection temperature under load.

An object of the present invention is to provide a flame retardant resin composition having a good fluidity and excellent recycling property, to yield a molded article having excellent rigidity and flame retardancy and is particularly applicable for a molded article having a small thickness. Another object of the present invention is to provide a molded article from such a composition.

DISCLOSURE OF THE INVENTION

The present invention provides, as a solving means, a flame retardant resin composition comprising 100 parts by weight of a thermoplastic resin (A); 0.5 to 100 parts by weight of a liquid crystal polymer (B); and 0.1 to 30 parts by weight of a silicone compound (C) as a flame retardant, and a molded article comprising the composition.

DETAILED DESCRIPTION OF THE INVENTION

The thermoplastic resin used as the component (A) in the present invention includes at least one resin selected from the group consisting of polycarbonate resins, polyamide resins, polystyrene resins, polyester resins, polyolefin resins, polyurethane resins, polyether resins, polyester-ether resins, polyamide ether resins and polyphenylene oxide resins. Among these, polycarbonate resins are preferred.

The polycarbonate resins include those obtained through the reaction of divalent phenols with carbonate precursors by a known solution process or melting process.

The divalent phenols include at least one selected from 2,2-bis(4-hydroxyphenyl)propane(bisphenol A), bis(4-hydroxyphenyl)methane, 1,1-bis(4-hydroxyphenyl)ethane, 2,2-bis(4-hydroxy-3,5-dimethylphenyl)propane, 2,2-bis(4-hydroxy-3,5-dibromophenyl)propane, 2,2-bis(4-hydroxy-3-methylphenyl)propane, bis(4-hydroxyphenyl) sulfide, bis(4-hydroxyphenyl)sulfone etc. Among these, bis(4-hydroxyphenyl)alkanes are preferred, and bisphenol A is particularly preferred.

The carbonate precursors include at least one selected from diaryl carbonates such as diphenyl carbonate, dialkyl carbonates such as dimethyl carbonate and diethyl carbonate, carbonyl halides such as phosgene, and haloformates such as dihaloformates of a divalent phenol, etc.

Although the number average molecular weight of the polycarbonate resins is not particularly limited, it is preferable that the molecular weight ranges from about 17,000 to about 32,000 to impart mechanical strength required for practical use to the molded articles obtained from the composition.

The polyamide resins include polyamide resins and the copolymers thereof formed from diamines and dicarboxylic acids. Specifically, nylon-66, polyhexamethylene sevacamide (nylon 6-10), polyhexamethylene dodecanamide (nylon 6-12), polydodecamethylene dodecanamide (nylon 1212), polymethaxylylene adipamide (nylon MXD6), polytetramethylene adipamide (nylon 46), and the mixtures or copolymers of these; copolymers such as nylon 6/66, nylon 66/6T containing 50 mole % or less of component 6T (6T: polyhexamethylene telephthalamide), nylon 66/6I containing 50 mole % or less of component 6I (6I: polyhexamethylene isophthalamide), nylon 6T/6I/66, nylon 6T/6I/610 etc.; copolymers of polyhexamethylene terephthalamide (nylon 6T), polyhexamethylene isophthalamide (nylon 6I), poly(2-methylpentamethylene)terephthalamide (nylon M5T), poly (2-methylpentamethylene) isophthalamide (nylon-M5I), nylon 6T/6I, nylon 6T/M5T etc. may be proposed.

Further, the ring opening polymerization products of cyclic lactams, polycondensation products of aminocarboxylic acids, and copolymers consisting of these components, specifically aliphatic polyamide resins and the copolymers thereof such as nylon 6, poly-ω-undecanamide (nylon 11), poly-ω-dodecanamide (nylon 12) etc.; and polyamides consisting of diamines and dicarboxylic acids and the copolymers thereof, specifically nylon 6T/6, nylon 6T/11, nylon 6T/12, nylon 6T/6I/12, nylon 6T/6I/610/12 etc., and the mixtures thereof are included.

The polystyrene resin includes polymers of styrene and styrene derivatives such as α-substituted styrenes and nucleus-substituted styrenes. Also, the polystyrene resin includes copolymers constituted of one or more of these monomers as a major component and one or more monomers selected from vinyl compounds such as acrylonitrile, acrylic acid and methacrylic acid and/or conjugated diene compounds such as butadiene and isoprene. Examples of the polystyrene resin include polystyrene, high-impact polystyrene (HIPS resin), acrylonitrile/butadiene/styrene copolymer (ABS resin), acrylonitrile/styrene copolymer (AS resin), styrene/methacrylate copolymer (MS resin), styrene/butadiene copolymer (SBS resin) etc. Among these, ABS resin and AS resin are preferred.

The polystyrene resin may also include styrene copolymers in which a carboxyl group-containing unsaturated compound is copolymerized as a compatibilizing component for increasing the compatibility with polyamide resins. The styrene copolymers in which a carboxyl group-containing unsaturated compound is copolymerized are copolymers obtained by polymerizing a carboxyl group-containing unsaturated compound and optionally one or more other monomers copolymerizable therewith in the presence of a rubbery polymer. Specifically, the components thereof are exemplified as follows.

1) A graft copolymer obtained by copolymerizing monomers containing an aromatic vinyl monomer as essential components, or monomers containing an aromatic vinyl monomer and a carboxyl group-containing unsaturated compound as essential components, in the presence of a rubbery polymer obtained by copolymerizing a carboxyl group-containing unsaturated compound;
2) a graft copolymer obtained by copolymerizing monomers containing an aromatic vinyl and a carboxyl group-containing unsaturated compound as essential components in the presence of a rubbery polymer;
3) a mixture of a rubber reinforced styrene resin that is not copolymerized with a carboxyl group-containing unsaturated compound and a copolymer of monomers containing a carboxyl group-containing unsaturated compound and an aromatic vinyl as essential components;
4) a mixture of the components described in the above items 1) and 2), and a copolymer of monomers containing a carboxyl group-containing unsaturated compound and an aromatic vinyl as essential components; and
5) a mixture of the components described in the above items 1), 2), 3) and 4), and a copolymer containing an aromatic vinyl as essential components.

In the above items 1) to 5), the aromatic vinyl is preferably styrene and the monomer that is copolymerized with the aromatic vinyl is preferably acrylonitrile. The carboxyl group-containing unsaturated compound is preferably 0.1 to 8% by weight and more preferably 0.2 to 7% by weight in the component (C).

The liquid crystal polymer used as the component (B) in the present invention includes aromatic-aliphatic polyesters, completely aromatic polyesters, aromatic polyazomethylenes, polyimide esters etc., and among these, those showing anisotropic molten forms are selected.

The aromatic-aliphatic polyesters include copolymers or the like of polyethylene terephthalate and benzoic acid. The completely aromatic polyesters include copolymers of p-hydroxybenzoic acid and 6-hydroxy-2-naphthoic acid; copolymers of p-hydroxybenzoic acid, terephthalic acid and 6-hydroxy-2-naphthol etc. The aromatic polyazomethylenes include poly(nitrilo-2-methyl-1,4-phenylenenitroethylidene) etc. The polyimide polyesters include copolymers of 2,6-naphthalenedicarboxylic acid, terephthalic acid and 4-(4-hydroxyphthalimide)phenol, copolymers of diphenol and 4-(4-hydroxyphthalimide) benzoic acid etc.

Whether or not these copolymers are liquid crystal polymers is judged by confirming if the polymers exhibit optical anisotropy in a molten state. This is readily confirmed as follows. For example, a specimen adjusted so as to have a thickness of 1 mm or less is placed on a heating stage of a polarizing microscope and the specimen is heated at a temperature elevation rate of 2° C./minute in a nitrogen atmosphere. In this state, the polarizer of the polarizing microscope is crossed and the specimen is easily observed at a magnification of ×40 or ×100. In such a method, the temperature at which the copolymer transitions to a liquid crystal phase can be measured simultaneously. The transition temperature can be measured also by differential scanning calorimetry (DSC).

Furthermore, in the case where the liquid crystal polymer as the component (B) is compounded, the rigidity or strength of the composition is not substantially decreased when the molded article is pulverized and reused, so that the resulting flame retardant composition of the present invention has excellent recycling properties.

The compounding amount of the liquid crystal polymer as the component (B) is 0.5 to 100 parts by weight, preferably 1 to 50 parts by weight, more preferably 3 to 40 parts by weight, to 100 parts by weight of the thermoplastic resin as the component (A).

The silicone compound used as the component (C) in the present invention acts as a flame retardant and those silicone compounds that is not served as a flame retardant are not included in the component (C) in the present invention.

In order to act as a flame retardant, the silicone compound as the component (C) has a weight average molecular weight of preferably about 5,000 to about 500,000, more preferably about 5,000 to about 300,000.

In order to act as a flame retardant, the silicone compound as the component (C) preferably has a branched structure. However, it may contain a linear structure as far as it can serve as a flame retardant. In the case where the silicone compound as the component (C) is of a linear structure, it comprises an M unit and a D unit represented by the following formulae. On the other hand, in the case where it is of a branched structure, it comprises a T unit and/or a Q unit represented by the following formulae as well as an M unit and a D unit. In the following formulae, R represents a functional group.

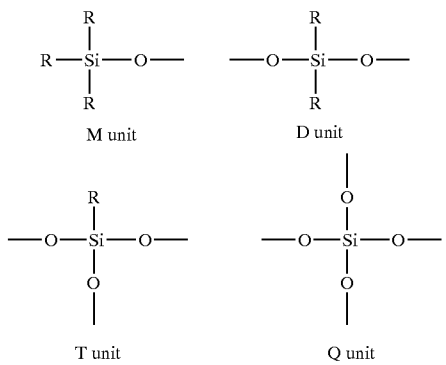

The chemical structure of the silicone compound having a branched structure is not particularly limited and includes, for example, the structures represented by the following formula.

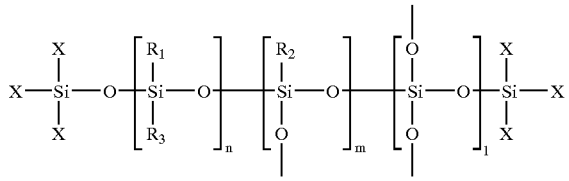

wherein, $R_1$, $R_2$ and $R_3$ independently represent a monovalent organic group such as a substituted or unsubstituted alkyl group and a substituted or unsubstituted aryl group, hydrogen, hydroxyl, vinyl group, or a siloxane structure; X represents a terminal functional group, which is the same as or different from $R_1$, $R_2$ and $R_3$; and n, m and l are numbers such that the polymer has a branched structure and its weight average molecular weight is within the above-mentioned range.

The silicone compound as the component (C) preferably is methylphenylsilicone, and more preferably methylphenylsilicone having a branched structure.

In the case where methylphenylsilicone is used as the silicone compound as the component (C), the molar ratio of the methyl group and phenyl group is preferably 80/20 to 10/90, and more preferably 70/30 to 90/10.

The compounding amount of the silicone compound as the component (C) is 0.1 to 30 parts by weight, preferably 0.1 to 25 parts by weight, and more preferably 0.5 to 25 parts by weight, to 100 parts by weight of the thermoplastic resin as the component (A).

The flame retardant resin composition of the present invention may contain, further as an additive for a flame retardant, at least one selected from nitrogen-containing compounds having a triazine ring such as melamine, metal hydroxides such as calcium hydroxide, dolomite and hydrotalcite, metal oxides such as tin oxide and zirconium oxide, metal carbonates such as magnesium carbonate, zinc carbonate, calcium carbonate and barium carbonate, metal borates such as zinc borate, zinc metaborate and barium metaborate, fluorine-containing compounds such as polytetrafluoroethylene, and metal salts of aromatic sulfur compounds such as sodium benzenesulfonate.

The blending amount of the additive for the flame retardant is 0.01 to 50 parts by weight, preferably 0.01 to 40 parts by weight, and more preferably 0.01 to 30 parts by weight, to 100 parts by weight of the thermoplastic resin as the component (A).

The flame retardant resin composition of the present invention may contain, if necessary, particulate or fibrous fillers, stabilizers against heat, light or oxygen (antioxidants such as phenol compounds and phosphorus compounds; ultraviolet absorbents such as benzotriazole compounds, benzophenone compounds and phenyl salicylate compounds; heat stabilizers such as hindered amine stabilizers, tin compounds and epoxylated compounds), plasticizers, sliding improvers such as polydimethylsiloxane, lubricants, releasing agents, antistatic agents, colorants etc.

The flame retardant resin composition of the present invention can provide molded articles, in particular thin molded articles having excellent rigidity, so that they are preferable for applications where a small thickness and high rigidity are required, for example, the exterior or housing of home electric appliances such as a television set, or the housing or chassis of OA appliances and electronic appliances.

EXAMPLES

Hereinafter, the present invention will be illustrated in more detail by referring to examples. However, the present invention should not be limited thereto. In the Example and Comparative Example below, the following components were used.

Component (A):
  PC: Polycarbonate (Panlight L1225, produced by Teijin Ltd.)
Component (B):
  LCP: Liquid crystal polymer (Vectra A950, produced by Polyplastic Co., Ltd.)
Component (C):
  Silicone: Methylphenylsilicone having a branched structure (X-40 9805, produced by Shin-Etsu Chemical Co., Ltd.)

Example 1 and Comparative Example 1

The components were blended according to the formula (expressed in % by weight) shown in Table 1, and melted and kneaded by use of an extruder (biaxial extruder), to obtain a resin composition in the form of pellets. The extrusion molding was conducted at the temperature of 250° C. Each composition was measured of various physical properties by the following method. Results are shown in Table 1.

Fluidity

Using a spiral flow mold (thickness: 2 mm), a spiral flow length (cm) was respectively obtained at 270° C., 280° C. and 290° C. under a load of 800 MPa.

Flexural Strength and Modulus of Flexural Elasticity

Using a test piece having a thickness of 1/16 inch injection-molded with an injection molding machine (cylinder temperature: 280° C., mold temperature: 60° C.), flexural tests were conducted according to ASTM D790, to evaluate flexural strength and modulus of flexural elasticity.

Heat Resistance

About injection molded specimens having a thickness of ¼ inch, the deflection test (under a load of 18.6 Mpa) were performed according to ASTM D648-82, to measure HDT (the heat deflection temperature).

Flame Resistance

Vertical flame resistance tests were performed according to UL-94. The thickness of the test piece was 1/16 inch.

Recycling Property

An injection molded article from the pellets of a non-recycled resin composition was pulverized, again molded into pellets using an extruder, and then injection-molded. Flexural strength was measured according to the above method, and the results obtained were compared with those obtained in the flexural strength test.

TABLE 1

|  |  | Example 1 | Comparative Example 1 |
|---|---|---|---|
| (A), (C) PC/Silicone = 98/2 |  | 80 | 100 |
| (B) LCP |  | 20 | — |
| Fluidity (cm) | 270° C. | 30 | 16 |
|  | 280° C. | 32 | 18 |
|  | 290° C. | 35 | 21 |
| Flexural strength (MPa) | ¼ inch | 97 | 87 |
|  | ⅛ inch | 122 | 93 |
|  | 1/16 inch | 155 | 104 |
| Modulus of flexural elasticity (MPa) | ¼ inch | 2900 | 2100 |
|  | ⅛ inch | 3700 | 2200 |
|  | 1/16 inch | 5200 | 2710 |
| HDT (under a load of 18.6 MPa (° C.) |  | 130 | 130 |
| Flame retardancy (UL94 1/16 inch) |  | V-0 | V-0 |
| Flexural strength after recycle (MPa) | ¼ inch | 97 | 87 |
|  | ⅛ inch | 120 | 93 |
|  | 1/16 inch | 154 | 104 |

As will be apparent from Table 1, the flame retardant composition of Example 1 had good fluidity and thus exhibited excellent moldability. Further, thinner molded articles exhibited higher flexural strength and higher modulus flexural elasticity, so that they practically had sufficient heat resistance and flame retardancy.

What is claimed is:

1. A flame retardant resin composition comprising:
   100 parts by weight of a thermoplastic resin (A), 0.5 to 100 parts by weight of a liquid crystal polymer (B), and 0.1 to 30 parts by weight of a silicone compound (C) as a flame retardant.

2. The composition as claimed in claim 1, wherein the thermoplastic resin (A) is an aromatic polycarbonate.

3. The composition as claimed in claim 1, wherein the silicone compound (C) as a flame retardant has a weight average molecular weight of 5,000 to 500,000.

4. The composition as claimed in claim 1, wherein the silicone compound (C) as a flame retardant contains a branched structure.

5. The composition as claimed in claim 1, wherein the silicone compound (C) as a flame retardant contains methylphenylsilicone.

6. The composition as claimed in claim 5, wherein the methylphenylsilicone has a mole ratio of methyl/phenyl of 80/20 to 10/90.

7. The composition as claimed in claim 1, which further comprises, as an additive for a flame retardant, at least one selected from the group consisting of nitrogen-containing compounds having a triazine ring, metal hydroxides, metal oxides, metal carbonates, metal borates, fluorine-containing compounds and metal salts of aromatic sulfur compounds.

8. A molded article comprising the flame retardant resin composition as claimed in claim 1.

9. A flame retardant resin composition comprising 100 parts by weight of an aromatic polycarbonate thermoplastic resin (A), 1–50 parts by weight of a polyester liquid crystal polymer (B) and 0.1–30 parts by weight of a silicone compound (C) as a flame retardant.

10. The composition as claimed in claim 9, wherein the polyester is an aromatic-aliphatic polyester.

11. The composition as claimed in claim 9, wherein the polyester is an aromatic polyester.

12. The composition as claimed in claim 11, wherein the aromatic polyester is selected from the group consisting of a copolymer of p-hydroxybenzoic acid and 6-hydroxy-2-naphthoic acid and a copolymer of p-hydroxybenzoic acid, terephthalic acid and 6-hydroxy-2-naphthol.

13. The composition as claimed in claim 9, wherein the silicone compound (C) is methylphenylsilicone.

14. The composition as claimed in claim 13, wherein the methylphenylsilicone has a branched structure.

15. The composition as claimed in claim 13, wherein the methylphenylsilicone has a mole ratio of methyl/phenyl of from 80/20 to 10/90.

* * * * *